(12) United States Patent
Futahashi et al.

(10) Patent No.: US 8,775,026 B2
(45) Date of Patent: Jul. 8, 2014

(54) VEHICLE STEERING CONTROL DEVICE AND METHOD

(75) Inventors: Kensuke Futahashi, Takasago (JP);
Masataka Kawaguchi, Takasago (JP);
Yasunobu Igashima, Sagamihara (JP);
Hiroyuki Iiyama, Sagamihara (JP);
Ryota Adachi, Sagamihara (JP);
Takaharu Hiroe, Takasago (JP)

(73) Assignee: Mitsubishi Nichiyu Forklift Co., Ltd., Kyoto (JP)

( * ) Notice: Subject to any disclaimer, the term of this patent is extended or adjusted under 35 U.S.C. 154(b) by 813 days.

(21) Appl. No.: 12/988,097

(22) PCT Filed: Apr. 9, 2009

(86) PCT No.: PCT/JP2009/057284
§ 371 (c)(1),
(2), (4) Date: Nov. 23, 2010

(87) PCT Pub. No.: WO2009/128388
PCT Pub. Date: Oct. 22, 2009

(65) Prior Publication Data
US 2011/0060503 A1    Mar. 10, 2011

(30) Foreign Application Priority Data

Apr. 17, 2008  (JP) ................................ 2008-107443

(51) Int. Cl.
*B62D 6/00*  (2006.01)

(52) U.S. Cl.
USPC .......................................................... 701/41

(58) Field of Classification Search
CPC ...... B62D 5/005; B62D 5/006; B62D 5/0466; B62D 5/0481; B62D 6/00; B62D 6/002; B62D 6/008; B62D 7/008
USPC ............................... 701/36, 41; 180/443, 446
See application file for complete search history.

(56) References Cited

U.S. PATENT DOCUMENTS

| | | |
|---|---|---|
| 5,275,251 A | 1/1994 | Thomsen et al. |
| 5,828,972 A | 10/1998 | Asanuma et al. |

(Continued)

FOREIGN PATENT DOCUMENTS

| | | |
|---|---|---|
| EP | 1 527 980 A1 | 5/2005 |
| GB | 2 259 892 A | 3/1993 |

(Continued)

OTHER PUBLICATIONS

Extended European Search Report dated Oct. 5, 2012.

(Continued)

*Primary Examiner* — Khoi Tran
*Assistant Examiner* — Adam Mott
(74) *Attorney, Agent, or Firm* — Birch, Stewart, Kolasch & Birch, LLP

(57) ABSTRACT

A steering control device obtains a command steering reactive force according to a wheel angle based on a wheel angle and table data representing the correlation between the wheel angle and the command steering reactive force, and which controls an electric-control brake to make the steering reactive force equal to the command steering reactive force. The steering control device: obtains a correction coefficient according to vehicle state amounts based on the vehicle state amounts other than the wheel angle, which are detected by vehicle state amount detecting means, and table data representing the correlation between the vehicle state amounts and the correction coefficients; corrects the table data by using the correction coefficients; obtains a command steering reactive force according to the wheel angle based on the table data and the wheel angle; and controls the electric-control brake to make the steering reactive force equal to the command steering reactive force.

2 Claims, 6 Drawing Sheets

(56) References Cited

U.S. PATENT DOCUMENTS

| | | | |
|---|---|---|---|
| 6,112,845 A * | 9/2000 | Oyama et al. | 180/443 |
| 6,411,276 B1 * | 6/2002 | Braun et al. | 345/156 |
| 7,207,411 B2 * | 4/2007 | Duits et al. | 180/402 |
| 2004/0003954 A1 * | 1/2004 | Sugitani et al. | 180/402 |
| 2005/0281650 A1 * | 12/2005 | Bozem et al. | 414/490 |
| 2006/0200290 A1 * | 9/2006 | Chino et al. | 701/41 |
| 2007/0265077 A1 * | 11/2007 | Tom et al. | 463/37 |

FOREIGN PATENT DOCUMENTS

| | | | |
|---|---|---|---|
| JP | 4-230473 A | 8/1992 | |
| JP | 4-306175 A | 10/1992 | |
| JP | 5-85378 A | 4/1993 | |
| JP | 5-105100 A | 4/1993 | |
| JP | 6-344937 A | 12/1994 | |
| JP | 9-136654 A | 5/1997 | |
| JP | 2003-48555 A | 2/2003 | |
| JP | 2004-34928 A | 2/2004 | |
| JP | 2004-217114 A | 8/2004 | |
| JP | 2004-359000 A | 12/2004 | |
| JP | 2004359000 A * | 12/2004 | |
| JP | 2005-151134 A | 6/2005 | |
| JP | 2005-297877 A | 10/2005 | |
| JP | 2006-151241 A | 6/2006 | |
| JP | 2006-193083 A | 7/2006 | |
| JP | 2006-240399 A | 9/2006 | |
| JP | 3868287 B2 | 1/2007 | |
| JP | 2007-145207 A | 6/2007 | |
| WO | 03/010040 A1 | 2/2003 | |

OTHER PUBLICATIONS

Japanese Office Action mailed Feb. 12, 2013 for JP Patent Application No. 2008-107443 with English translation.

* cited by examiner

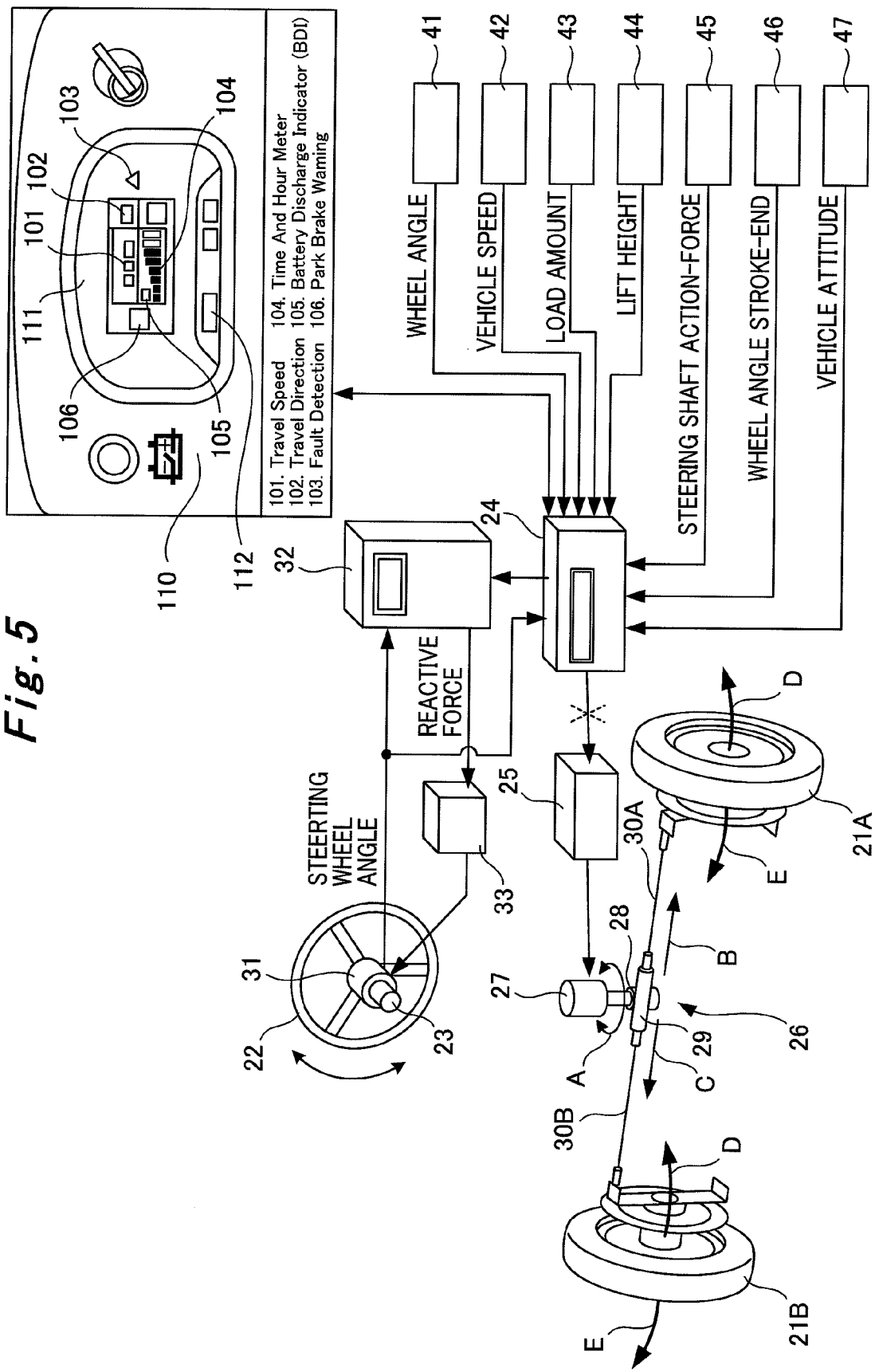

VEHICLE STEERING CONTROL DEVICE AND METHOD

BACKGROUND OF THE INVENTION

1. Field of the Invention

The present invention relates to a vehicle steering control device and method.

2. Description of the Related Art

Some industrial vehicles such as forklifts are equipped with an all-electric steering control device. The all-electric steering control device changes the wheel angle (steering angle) of each steered wheel (by detecting the steering wheel angle which is the rotation angle of a steering wheel and driving a steering actuator according to this steering wheel angle.

A configuration of such a steering control device will be further described based on FIG. 6. FIG. 6 is a diagram illustrating a configuration of a conventional steering control device for an industrial vehicle.

As shown in FIG. 6, a steering actuator 6 has a configuration including: an electric motor 7; a pinion 8 fixed on a rotary shaft of the electric motor 7; a rack 9 meshing with the pinion 8; and rods 10A and 10B respectively connecting two left and right (vehicle-width direction) end portions of the rack 9 with left and right steered wheels 1A and 1B. With this configuration, in the steering actuator 6, the electric motor 7 is actuated to rotate the pinion 8 as indicated by the arrow A, and the rack 9 in mesh with the pinion 8 as well as the rods 10A and 10B are thereby moved either to the left or to the right as indicated by the arrow B or C. As a consequence, the steered wheels 1A and 1B are steered either to the left or to the right as indicated by the arrow D or E.

Meanwhile, a steering wheel angle sensor 3 is attached to a rotary shaft of a steering wheel 2 for steering the steered wheels 1A and 1B. The steering wheel angle sensor 3 detects a steering wheel angle which is the rotation angle of the steering wheel 2, and outputs a detection signal of the steering wheel angle to a steering controller 4. The steering controller 4 converts the steering wheel angle detected by the steering wheel angle sensor 3 to a command wheel angle on the basis of a previously-stored correlation between the steering wheel angle and the wheel angle, and outputs the obtained command wheel angle to a motor driver 5. The motor driver 5 drives the electric motor 7 on the basis of the command wheel angle inputted from the steering controller 4. As a consequence, the wheel angle of each of the steered wheels 1A and 1B is made equal to the command wheel angle.

However, the steering wheel 2 and each of the steered wheels 1A and 1B are not mechanically coupled to each other in this all-electric steering control device, which causes the following problems.

(1) Since the reactive force is not transmitted from the steered wheels 1A and 1B to the steering wheel 2, the steering force (which is a force required for an operator to operate the steering wheel 2) is constant regardless of the running state of the vehicle. This deteriorates the steering feeling.

(2) An operator who is not used to the steering easily brings the vehicle into an unstable running state while driving at a high speed since the operator can operate the steering wheel while driving at a high speed with the same steering force as while stopping the vehicle.

To cope with these problems, as disclosed in Patent Document 1 listed below, a steering control device is proposed which is capable of imparting a steering reactive force to a steering wheel. FIG. 7 is a diagram illustrating a configuration of a conventional steering control device capable of imparting a steering reactive force to a steering wheel. Note that, in FIG. 7, the same parts as in FIG. 6 are given the same reference numerals, and their duplicated description will be omitted.

As shown in FIG. 7, this steering control device is equipped with a steering reactive force controller 11, a brake driver 12, and an electric-control brake 13, in addition to the same configuration as in FIG. 6. The electric-control brake 13 is attached to a rotary shaft of the steering wheel 2, and is capable of imparting a steering reactive force to the steering wheel 2 by exerting an electric brake force on the rotary shaft. The steering reactive force controller 11 receives a detection signal of a steering wheel angle (operation angle) from the steering wheel angle sensor 3, obtains a command steering reactive force on the basis of the received steering wheel angle and the previously-stored correlation between the steering wheel angle and the command steering reactive force (target operation torque), and outputs the obtained command steering reactive force to the brake driver 12. The brake driver 12 drives the electric-control brake 13 on the basis of the command steering reactive force inputted from the steering reactive force controller 11, so as to make the brake force of the electric-control brake 13 equal to the command steering reactive force. In this way, the steering reactive force according to the steering wheel angle is imparted to the steering wheel 2. Note that, Patent Document 1 listed below also provides a description that a vehicle speed sensor may be provided so that the command steering reactive force (target operation torque) may be associated with the steering wheel angle and a vehicle speed.

PRIOR ART DOCUMENT

Patent Document

Patent Document 1: Japanese Patent No. 3868287 (see paragraph and the like)

SUMMARY OF THE INVENTION

Problems to be Solved by the Invention

Steering control devices such as in Patent Document 1 have been heretofore proposed in order to solve the problems such as (1) and (2) described above. However, no document at present refers to a specific control method for realizing a steering control device (steering reactive force system) capable of imparting a steering reactive force to a steering wheel.

The present invention has therefore been made in view of the above circumstances, and has a task to provide a steering control device and method for a vehicle, such as an industrial vehicle, which contribute to realizing a steering control device capable of imparting a steering reactive force to a steering wheel.

Means for Solving the Problems

A vehicle steering control device according to the first invention which solves the above problems is a vehicle steering control device configured to obtain a command steering reactive force according to a wheel angle detected by wheel angle detecting means, on the basis of the wheel angle detected by the wheel angle detecting means and a correlation between a wheel angle and a command steering reactive force, and to control steering reactive force imparting means provided to a steering wheel so as to make a steering reactive force to be imparted to the steering wheel by the steering reactive force imparting means equal to the obtained command steering reactive force, wherein the device is configured to: obtain a correction coefficient according to a vehicle state amount other than the wheel angle on the basis of the vehicle state amount other than the wheel angle and a correlation between the vehicle state amount and a correction coefficient, the vehicle state amount being detected by vehicle state amount detecting means; correct the correlation between the wheel angle and the command steering reactive force by using the correction coefficient, and obtain a command steering reactive force according to the wheel angle detected by the wheel angle detecting means, on the basis of the corrected correlation between the wheel angle and a command steering reactive force and the wheel angle detected by the wheel angle detecting means; and control the steering reactive force imparting means so as to make the steering reactive force to be imparted to the steering wheel equal to the obtained command steering reactive force.

Further, in a vehicle steering control device according to the second invention, in the vehicle steering control device of the first invention, the vehicle state amount other than the wheel angle is at least one of a deviation between a wheel angle obtained by converting a steering wheel angle detected by steering wheel angle detecting means and a wheel angle detected by the wheel angle detecting means, a vehicle speed detected by vehicle speed detecting means, a load amount detected by load amount detecting means, a lift height detected by lift height detecting means, a steering shaft action force detected by steering shaft action-force detecting means, a wheel angle stroke end detected by wheel angle stroke-end detecting means, and a vehicle attitude detected by vehicle attitude detecting means.

Further, in a vehicle steering control device according to the third invention, the device is configured to set an intermittent steering reactive force according to a steering wheel angle detected by the steering wheel angle detecting means as the command steering reactive force if vehicle anomaly detecting means detects an anomaly of a vehicle, and control the steering reactive force imparting means so as to make the steering reactive force to be imparted to the steering wheel equal to the set command steering reactive force.

Further, in a vehicle steering control device according to the fourth invention, the device is configured to set the command steering reactive force to zero and thus cause the steering reactive force imparting means to impart no steering reactive force to the steering wheel if judging that the wheel angle detected by the wheel angle detecting means is in a neutral state.

Further, in a vehicle steering control device according to the fifth invention, the device is configured to: obtain a command steering reactive force according to a steering wheel angle detected by the steering wheel angle detecting means, on the basis of the steering wheel angle detected by the steering wheel angle detecting means and a correlation between the steering wheel angle and a command steering reactive force, when the steering wheel is used as an input device of a control panel; and control the steering reactive force imparting means so as to make the steering reactive force to be imparted to the steering wheel equal to the obtained command steering reactive force.

Further, a vehicle steering control method according to the sixth invention is a vehicle steering control method configured to obtain a command steering reactive force according to a wheel angle detected by wheel angle detecting means, on the basis of the wheel angle detected by the wheel angle detecting means and a correlation between the wheel angle and a command steering reactive force, and control steering reactive force imparting means provided to a steering wheel so as to make a steering reactive force to be imparted to the steering wheel by the steering reactive force imparting means equal to the obtained command steering reactive force, the method comprising: a first step of obtaining a correction coefficient according to a vehicle state amount other than the wheel angle on the basis of the vehicle state amount other than the wheel angle and a correlation between the vehicle state amount and a correction coefficient, the vehicle state amount being detected by vehicle state amount detecting means; a second step of correcting the correlation between the wheel angle and a command steering reactive force by using the correction coefficient, and obtaining a command steering reactive force according to the wheel angle detected by the wheel angle detecting means, on the basis of the corrected correlation between the wheel angle and a command steering reactive force and the wheel angle detected by the wheel angle detecting means; and a third step of controlling the steering reactive force imparting means so as to make the steering reactive force to be imparted to the steering wheel equal to the obtained command steering reactive force.

Effects of the Invention

The vehicle steering control device according to the first invention is configured to obtain a command steering reactive force corresponding to a wheel angle detected by wheel angle detecting means, on the basis of the wheel angle detected by the wheel angle detecting means and a correlation between the wheel angle and a command steering reactive force, and to control steering reactive force imparting means provided to the steering wheel so as to make a steering reactive force to be imparted to the steering wheel by the steering reactive force imparting means equal to the obtained command steering reactive force, wherein the device is configured to: obtain a correction coefficient according to a vehicle state amount other than the wheel angle on the basis of the vehicle state amount other than the wheel angle and a correlation between the vehicle state amount and a correction coefficient, the vehicle state amount being detected by vehicle state amount detecting means; correct the correlation between the wheel angle and a command steering reactive force by using the correction coefficient, and obtain a command steering reactive force according to the wheel angle detected by the wheel angle detecting means, on the basis of the corrected correlation between the wheel angle and a command steering reactive force and the wheel angle detected by the wheel angle detecting means; and control the steering reactive force imparting means so as to make the steering reactive force to be imparted to the steering wheel equal to the obtained command steering reactive force. The steering control device imparts the steering reactive force to the steering wheel in consideration of not only the wheel angle but also the vehicle state amount other than the wheel angle, and thus improves the steering feeing given to an operator.

In the vehicle steering control device according to the second invention, in the vehicle steering control device of the first invention, the vehicle state amount other than the wheel angle is at least one of a deviation between a wheel angle obtained by converting a steering wheel angle detected by steering wheel angle detecting means and a wheel angle detected by the wheel angle detecting means, a vehicle speed detected by vehicle speed detecting means, a load amount detected by load amount detecting means, a lift height detected by lift height detecting means, a steering shaft action force detected by steering shaft action-force detecting means, a wheel angle stroke end detected by wheel angle stroke-end detecting means, and a vehicle attitude detected by vehicle attitude detecting means. The steering control device imparts the steering reactive force to the steering wheel in consideration of not only the wheel angle but also at least one of the wheel angle deviation which is the vehicle state amount other than the wheel angle, vehicle speed, load amount, lift height, steering shaft action force, the wheel angle stroke end and the vehicle attitude. Thus, the steering control device improves the steering feeing given to an operator.

In the vehicle steering control device according to the third invention, the device is configured to, in the vehicle steering control device according to the first or second invention, set an intermittent steering reactive force according to a steering wheel angle detected by the steering wheel angle detecting means as the command steering reactive force if vehicle anomaly detecting means detects an anomaly of a vehicle, and control the steering reactive force imparting means so as to make the steering reactive force to be imparted to the steering wheel equal to the set command steering reactive force. In this way, with the intermittent steering reactive force which cannot occur normally, the steering control device is capable of letting an operator recognize the occurrence of the vehicle anomaly in an earlier stage than in a conventional method of lighting a lamp indicative of the occurrence of the vehicle anomaly on a control panel or the like. This allows the operator to cope with the vehicle anomaly in an early stage.

In the vehicle steering control device according to the fourth invention, the device is configured to, in the vehicle steering control device of the first or second invention, set the command steering reactive force to zero and thus cause the steering reactive force imparting means to impart no steering reactive force to the steering wheel if judging that the wheel angle detected by the wheel angle detecting means is in a neutral state. This allows an operator to certainly recognize the neutral state of the steered wheels (wheel angle). The above configuration allows preventing even a beginner operator from causing an accident such as a collision or rollover because of failing to recognize the neutral state of the steered wheels (wheel angle). The configuration also gives an operator the same feeling as in the play of the steering wheel, and thus further improves the steering feeling given to the operator.

In the vehicle steering control device according to the fifth invention, the device is configured to, in the vehicle steering control device of the first or second invention: obtain a command steering reactive force according to a steering wheel angle detected by the steering wheel angle detecting means, on the basis of the steering wheel angle detected by the steering wheel angle detecting means and a correlation between the steering wheel angle and a command steering reactive force, when the steering wheel is used as an input device of the control panel; and control the steering reactive force imparting means so as to make the steering reactive force to be imparted to the steering wheel equal to the obtained command steering reactive force. The use of the steering wheel, to which a steering reactive force is imparted, as the input device of the control panel gives a click feeling and thus improves the operation feeling of the control panel, as compared to a switching operation in a conventional control panel which gives no click feeling and thus gives the poor operation feeling.

The vehicle steering control method according to the sixth invention is a vehicle steering control method according to the sixth invention configured to obtain a command steering reactive force according to a wheel angle detected by wheel angle detecting means, on the basis of the wheel angle detected by the wheel angle detecting means and a correlation between the wheel angle and a command steering reactive force, and control steering reactive force imparting means provided to the steering wheel so as to make a steering reactive force to be imparted to the steering wheel by the steering reactive force imparting means equal to the obtained command steering reactive force, the method comprising: the first step of obtaining a correction coefficient according to a vehicle state amount other than the wheel angle on the basis of the vehicle state amount other than the wheel angle and a correlation between the vehicle state amount and a correction coefficient, the vehicle state amount being detected by vehicle state amount detecting means; the second step of correcting the correlation between the wheel angle and a command steering reactive force by using the correction coefficient, and obtaining a command steering reactive force according to the wheel angle detected by the wheel angle detecting means, on the basis of the corrected correlation between the wheel angle and a command steering reactive force and the wheel angle detected by the wheel angle detecting means; and the third step of controlling the steering reactive force imparting means so as to make the steering reactive force to be imparted to the steering wheel equal to the obtained command steering reactive force. The steering control method allows imparting the steering reactive force to the steering wheel in consideration of not only the wheel angle but also the vehicle state amount other than the wheel angle, and thus improves the steering feeing given to an operator.

BRIEF DESCRIPTION OF THE DRAWINGS

FIG. 5 is a diagram illustrating a configuration of a steering control device for a forklift according to a fourth embodiment example of the present invention.

DETAILED DESCRIPTION OF THE INVENTION

Hereinbelow, embodiment examples of the present invention will be described in detail based on the drawings.

First Embodiment Example

Figure 1:
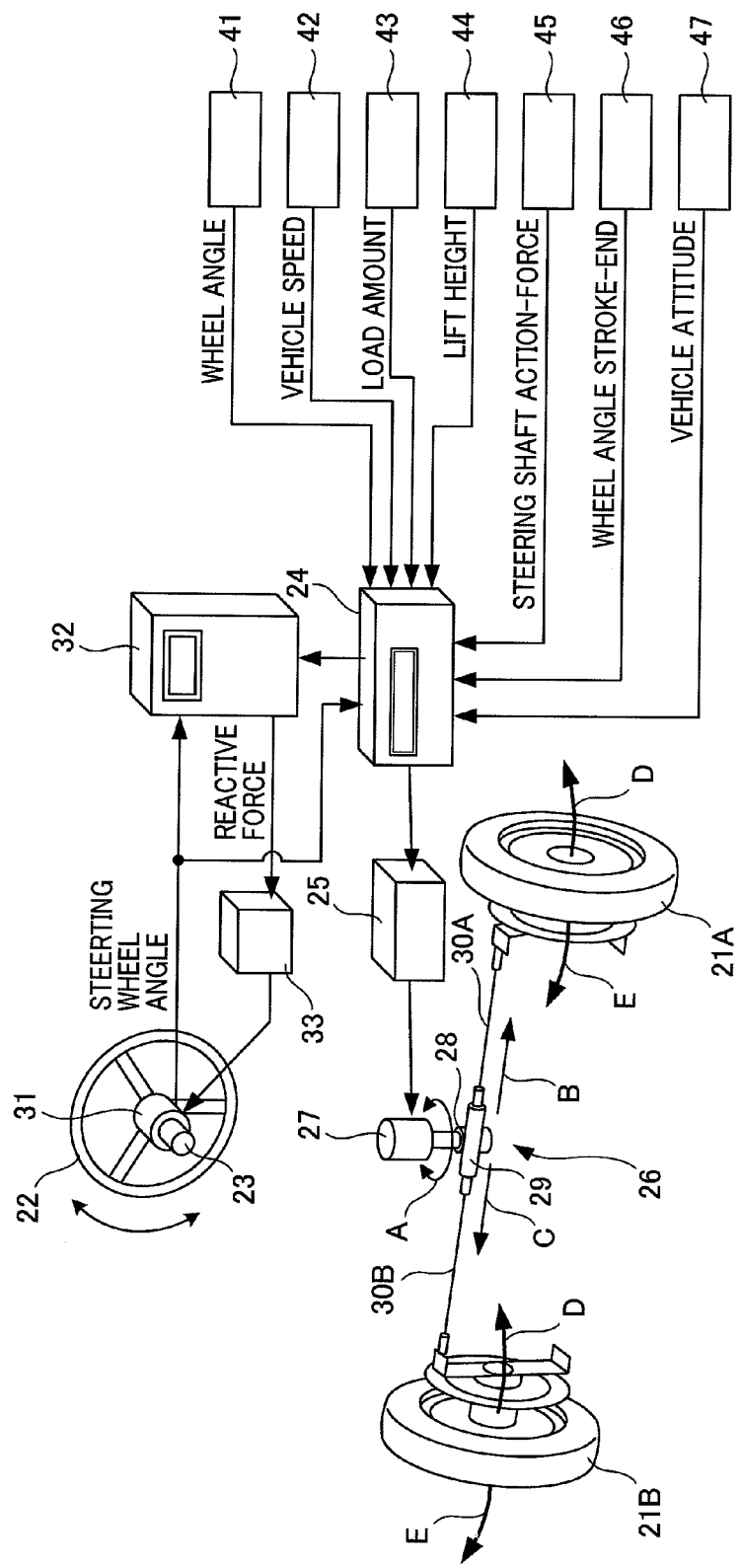
FIG. 1 is a diagram illustrating a configuration of a steering control device for a forklift according to a first embodiment example of the present invention.
Figure 2:
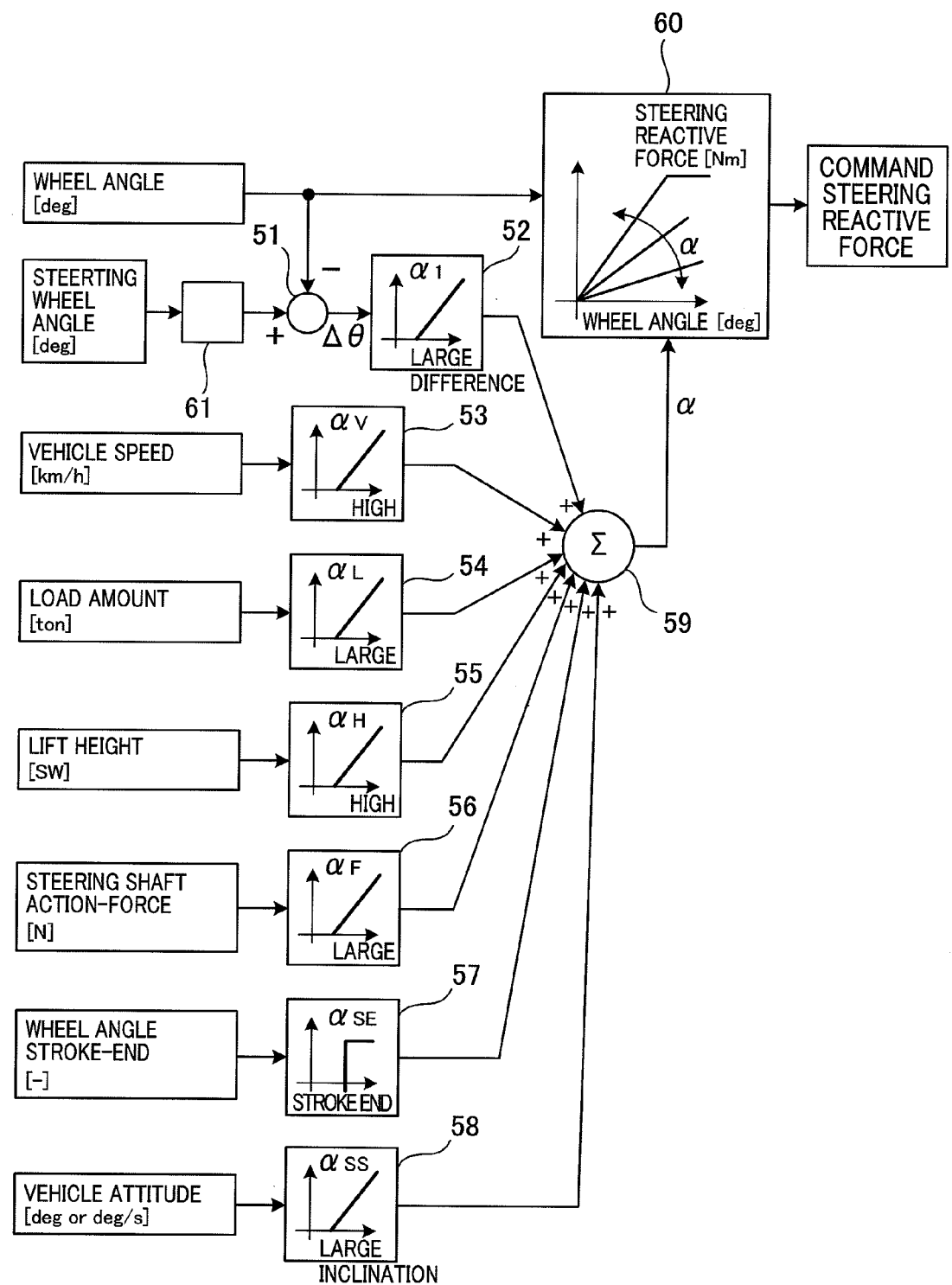
FIG. 2 is a block diagram illustrating process contents of a steering reactive force controller in the steering control device.

FIG. 1 is a diagram illustrating a steering control device for a forklift according to a first embodiment example of the present invention. FIG. 2 is a block diagram illustrating process contents of a steering reactive force controller in the steering control device. The steering control device of the first embodiment example is an all-electric steering control device, and a steering wheel and each of steered wheels are not mechanically coupled to each other.

As shown in FIG. 1, a steering actuator 26 has a configuration including: an electric motor 27; a pinion 28 fixed on the rotary shaft of the electric motor 27; a rack 29 engaging with the pinion 28; and rods 30A and 30B respectively connecting two left and right (vehicle-width direction) end portions of the rack 29 with left and right steered wheels 21A and 21B. With this configuration, in the steering actuator 26, the electric motor 27 is actuated to rotate the pinion 28 as indicated by the arrow A, and the rods 30A and 30B and the rack 29 which engages with the pinion 28 are thereby moved either to the left or to the right as indicated by the arrow B or C. As a consequence, the steered wheels (rear wheels) 21A and 21B are steered either to the left or to the right as indicated by the arrow D or E. Note that, the steering actuator is not limited to a rack and pinion actuator as in the illustrated example, and may be a ball and screw actuator instead.

Meanwhile, a steering wheel angle sensor 23 (steering wheel angle detecting means) as vehicle state amount detecting means is attached to a rotary shaft of a steering wheel 22 for steering the steered wheels 21A and 21B. The steering wheel angle sensor 23 detects a steering wheel angle which is the rotation angle of the steering wheel 22, and outputs a detection signal of the steering wheel angle to a steering controller 24. The steering controller 24 converts the steering wheel angle detected by the steering wheel angle sensor 23 to a command wheel angle on the basis of the previously-stored correlation between the steering wheel angle and the wheel angle, and outputs the obtained command wheel angle to a motor driver 25. The motor driver 25 drives the electric motor 27 on the basis of the command wheel angle inputted from the steering controller 24. As a consequence, the wheel angle of each of the steered wheels 21A and 21B is made equal to the command wheel angle.

In addition to the above configuration, the steering control device is equipped with an electric-control brake 31 as steering reactive force imparting means, a steering reactive force controller 32, and a brake driver 33. The electric-control brake 31 is attached to the rotary shaft of the steering wheel 22, and is capable of imparting a steering reactive force to the steering wheel 22 by exerting an electric brake force (braking torque) on the rotary shaft.

Although specific process contents will be described later (see FIG. 2), the steering reactive force controller 32 obtains a command steering reactive force in accordance with state amounts of a vehicle (forklift), and outputs the obtained command steering reactive force to the brake driver 33. The brake driver 33 drives the electric-control brake 22 on the basis of the command steering reactive force inputted from the steering reactive force controller 32 so as to make the brake force of the electric-control brake 31 equal to the command steering reactive force. In this way, a steering reactive force according to the state amounts of the vehicle is imparted to the steering wheel 22.

The steering controller 24 is electrically connected to a wheel angle sensor 41 (wheel angle detecting means), a vehicle speed sensor 42 (vehicle speed detecting means), a load amount sensor 43 (load amount detecting means), a lift height sensor 44 (lift height detecting means), a steering shaft action-force sensor 45 (steering shaft action-force detecting means), a wheel angle stroke-end sensor 46 (wheel angle stroke-end detecting means), and a vehicle attitude sensor 47 (vehicle attitude detecting means), all of which serve as vehicle state amount detecting means.

The wheel angle sensor 41 detects the wheel angle (steering angle) of each of the steered wheels 21A and 21B, and outputs a detection signal of the wheel angle to the steering controller 24. The vehicle speed sensor 42 detects a vehicle speed (running velocity of a forklift), and outputs a detection signal of the vehicle speed to the steering controller 24. The load amount sensor 43 detects the load amount of a fork of the forklift, and outputs a detection signal of the load amount to the steering controller 24. The lift height sensor 44 detects the lift height of the fork of the forklift (i.e., a load loaded on the fork), and outputs a detection signal of the lift height to the steering controller 24.

The steering shaft action-force sensor 45 detects the action force of a steering shaft (wheel shaft) for the steered wheels 21A and 21B, and outputs a detection signal of the steering shaft action force to the steering controller 24. The wheel angle stroke-end sensor 46 detects, when the steered wheels 21A and 21B are steered and their wheel angles reach their stroke end (certain maximum wheel angle), the wheel angle stroke ends of the steered wheels 21A and 21B, and outputs detection signals of the wheel angle stroke ends to the steering controller 24. The vehicle attitude sensor 47 detects the attitude (pitching, yawing, and rolling) of a vehicle, and outputs a detection signal of the vehicle attitude to the steering controller 24.

The steering controller 24 outputs, to the steering reactive force controller 32, the detection signals of the wheel angle, vehicle speed, load amount, lift height, steering shaft action force, wheel angle stroke end, and vehicle attitude which are inputted from the respective sensors 41 to 47. In addition, the steering reactive force controller 32 receives the detection signal of the steering wheel angle from the steering wheel angle sensor 23. Note that, the detection signals of the respective sensors 41 to 47 may be inputted to the steering reactive force controller 32 directly without passing through the steering controller 24. The steering reactive force controller 32 then obtains a command steering reactive force on the basis of the detection signals of the steering wheel angle, wheel angle, vehicle speed, load amount, lift height, steering shaft action force, wheel angle stroke end, and vehicle attitude which are inputted from the respective sensors 23 and 41 to 47.

Specific process contents of the steering reactive force controller 32 will now be described based on FIG. 2.

As shown in FIG. 2, the steering reactive force controller 32 includes a deviation calculator 51, an adder 59, and a wheel angle converter 61. The steering reactive force controller 32 also includes multiple sets of table data 52 to 58, and table data 60 in which an inclination is variable, the table data 52 to 58 and 60 being previously stored in a storage.

The table data 52 is table data representing the correlation between a deviation $\Delta\theta$ between the wheel angle and the actual wheel angle, and a correction coefficient $\alpha_1$ (in the illustrated example, the correlation in which the correction coefficient $\alpha_1$ changes linearly with respect to the deviation $\Delta\theta$). The table data 53 is table data representing the correlation between the vehicle speed and a correction coefficient $\alpha_V$ (in the illustrated example, the correlation in which the correction coefficient $\alpha_V$ changes linearly with respect to the vehicle speed). The table data 54 is table data representing the correlation between the load amount and a correction coefficient $\alpha_L$ (in the illustrated example, the correlation in which the correction coefficient $\alpha_L$ changes linearly with respect to the load amount). The table data 55 is table data representing the correlation between the lift height and a correction coefficient $\alpha_H$ (in the illustrated example, the correlation in which the correction coefficient $\alpha_H$ changes linearly with respect to the lift height). The table data 56 is table data representing the correlation between the steering shaft action force and a correction coefficient $\alpha_F$ (in the illustrated example, the correlation in which the correction coefficient $\alpha_F$ changes linearly with respect to the steering shaft action force). The table data 57 is table data representing the correlation between the wheel angle stroke end and a correction coefficient $\alpha_{SE}$ (in the illustrated example, the correlation in which the correction coefficient $\alpha_{SE}$ changes in a stepwise fashion at the wheel angle stroke end). The table data 58 is table data representing the correlation between the vehicle attitude and a correction coefficient $\alpha_{SS}$ (in the illustrated example, the correlation in which the correction coefficient $\alpha_{SS}$ changes linearly with respect to the vehicle attitude). These sets of table data 52 to 58 can be set appropriately through experiments, analyses, and the like.

The table data 60 is table data representing the correlation between the wheel angle and the steering reactive force (in the illustrated example, the correlation in which the steering reactive force changes linearly with respect to the wheel angle).

The wheel angle converter 61 converts the steering wheel angle detected by the steering wheel angle sensor 23 to a command wheel angle on the basis of the steering wheel angle detected by the steering wheel angle sensor 23 and the previously-stored correlation between the steering wheel angle and the wheel angle, and outputs the command wheel angle to the deviation calculator 51. The deviation calculator 51 calculates a deviation (command wheel angle—actual wheel angle) $\Delta\theta$ between the command wheel angle obtained by the conversion by the wheel angle converter 61 and the wheel angle detected by the wheel angle sensor 41.

Then, a able data 52 unit obtains a correction coefficient $\alpha_1$ according to the wheel angle deviation $\Delta\theta$ calculated by the deviation calculator 61, on the basis of the wheel angle deviation $\Delta\theta$ and the table data 52 representing the correlation between the wheel angle deviation and the correction coefficient $\alpha_1$, and outputs the obtained correction coefficient $\alpha_1$ to the adder 59. A table data 53 unit obtains a correction coefficient $\alpha_V$ according to the vehicle speed detected by the wheel angle sensor 42, on the basis of the vehicle speed detected by the wheel angle sensor 42 and the table data 53 representing the correlation between the vehicle speed and the correction coefficient $\alpha_V$, and outputs the obtained correction coefficient $\alpha_V$ to the adder 59. A table data 54 unit obtains a correction coefficient $\alpha_L$ according to the load amount detected by the load amount sensor 43, on the basis of the load amount detected by the load amount sensor 43 and the table data 54 representing the correlation between the load amount and the correction coefficient $\alpha_L$, and outputs the obtained correction coefficient $\alpha_L$ to the adder 59. A table data 55 unit obtains a correction coefficient $\alpha_H$ according to the lift height detected by the lift height sensor 44, on the basis of the lift height detected by the lift height sensor 44 and the table data 53 representing the correlation between the lift height and the correction coefficient $\alpha_H$, and outputs the obtained correction coefficient $\alpha_H$ to the adder 59.

A table data 56 unit obtains a correction coefficient $\alpha_F$ according to the steering shaft action force detected by the steering shaft action-force sensor 45, on the basis of the steering shaft action force detected by the steering shaft action-force sensor 45 and the table data 56 representing the correlation between the steering shaft action force and the correction coefficient $\alpha_F$, and outputs the obtained correction coefficient $\alpha_F$ to the adder 59. A table data 57 unit obtains a correction coefficient $\alpha_{SE}$ according to the wheel angle stroke end detected by the wheel angle stroke-end sensor 46, on the basis of the wheel angle stroke end detected by the wheel angle stroke-end sensor 46 and the table data 57 representing the correlation between the wheel angle stroke end and the correction coefficient $\alpha_{SE}$, and outputs the obtained correction coefficient $\alpha_{SE}$ to the adder 59. A table data 58 unit obtains a correction coefficient $\alpha_{SS}$ according to the vehicle attitude detected by the vehicle attitude sensor 47, on the basis of the vehicle attitude detected by the vehicle attitude sensor 47 and the table data 58 representing the correlation between the vehicle attitude and the correction coefficient $\alpha_{SS}$, and outputs the obtained correction coefficient $\alpha_{SS}$ to the adder 59.

The adder 59 adds the correction coefficient $\alpha_1$, correction coefficient $\alpha_V$, correction coefficient $\alpha_L$, correction coefficient $\alpha_H$, correction coefficient $\alpha_F$, correction coefficient $\alpha_{SS}$, and correction coefficient $\alpha_{SS}$, and outputs a value obtained by the addition, to a table data 60 unit as an inclination $\alpha$. Next, the table data 60 unit sets the inclination $\alpha$ obtained by the adder 59 as an inclination a of the table data 60 representing the correlation between the wheel angle and the steering reactive force. Thereafter, the table data 60 unit obtains a steering reactive force according to the wheel angle detected by the wheel angle sensor 41, on the basis of the table data 60, which represents the correlation between the wheel angle and the steering reactive force and to which the inclination $\alpha$ is set, and the wheel angle detected by the wheel angle sensor 41. Then, the table data 60 unit outputs the obtained steering reactive force to the brake driver 33 as a command steering reactive force in the above-described manner.

In the table data 60, the larger the wheel angle is, the larger the corresponding command steering reactive force is. In the table data 52, the larger the wheel angle deviation AO is, the larger the correction coefficient $\alpha_1$ is and the larger the corresponding command steering reactive force is. In the table data 53, the larger the vehicle speed is, the larger the correction coefficient $\alpha_V$ is and the larger the corresponding command steering reactive force is. In the table data 54, the larger the load amount is, the larger the correction coefficient $\alpha_L$ is and the larger the corresponding command steering reactive force is. In the table data 55, the larger the lift height is, the larger the correction coefficient $\alpha_H$ is and the larger the corresponding command steering reactive force is. In the table data 56, the larger the steering shaft action force is, the larger the correction coefficient $\alpha_F$ is and the larger the corresponding command steering reactive force is. In the table data 57, the correction coefficient $\alpha_{SE}$ becomes large in a stepwise fashion at the wheel angle stroke end, and the corresponding command steering reactive force also becomes large accordingly in a stepwise fashion. In the table data 58, the larger the inclination of the vehicle attitude is, the larger the correction coefficient $\alpha_{SS}$ is and the larger the corresponding command steering reactive force is.

As has been described above, the first embodiment example provides a steering control device for a forklift configured to obtain a command steering reactive force according to the wheel angle detected by the wheel angle sensor 41, on the basis of the wheel angle detected by the wheel angle sensor 41 and the table data 60 representing the correlation between the wheel angle and the command steering reactive force, and control the electric-control brake 31 provided to the steering wheel so as to make the steering reactive force to be imparted to the steering wheel 22 by the electric-control brake 31 equal to the obtained command steering reactive force. In the steering control device, the device is configured to: obtain correction coefficients $\alpha_1$, $\alpha_V$, $\alpha_L$, $\alpha_H$, $\alpha_F$, $\alpha_{SE}$, and $\alpha_{SS}$ respectively according to the vehicle state amounts other than the wheel angle (wheel angle deviation $\Delta\theta$, vehicle speed, load amount, lift height, steering shaft action force, wheel angle stroke end, and vehicle attitude) detected by the respective vehicle state amount detecting means (steering wheel angle sensor 23, vehicle speed sensor 42, load amount sensor 43, lift height sensor 44, steering shaft action-force sensor 45, wheel angle stroke-end sensor 46, and vehicle attitude sensor 47), on the basis of the vehicle state amounts other than the wheel angle, which are detected by the vehicle state amount detecting means, and the sets of table data 52 to 58 representing the correlation between the vehicle state amounts and the correction coefficients; correct the table data 60 representing the correlation between the wheel angle and the command steering reactive force by using the correction coefficients (set an inclination (α)); obtain a command steering reactive force according to the wheel angle detected by the wheel angle sensor 41, on the basis of the corrected table data 60 representing the correlation between the wheel angle and the command steering reactive force and the wheel angle detected by the wheel angle sensor 41; and control the electric-control brake 31 so as to make the steering reactive force to be imparted to the steering wheel 22 equal to the obtained command steering reactive force. The steering control device imparts the steering reactive force to the steering wheel in consideration of not only the wheel angle but also the vehicle state amounts other than the wheel angle, and thus improves the steering feeling given to an operator.

Second Embodiment Example

Figure 3:
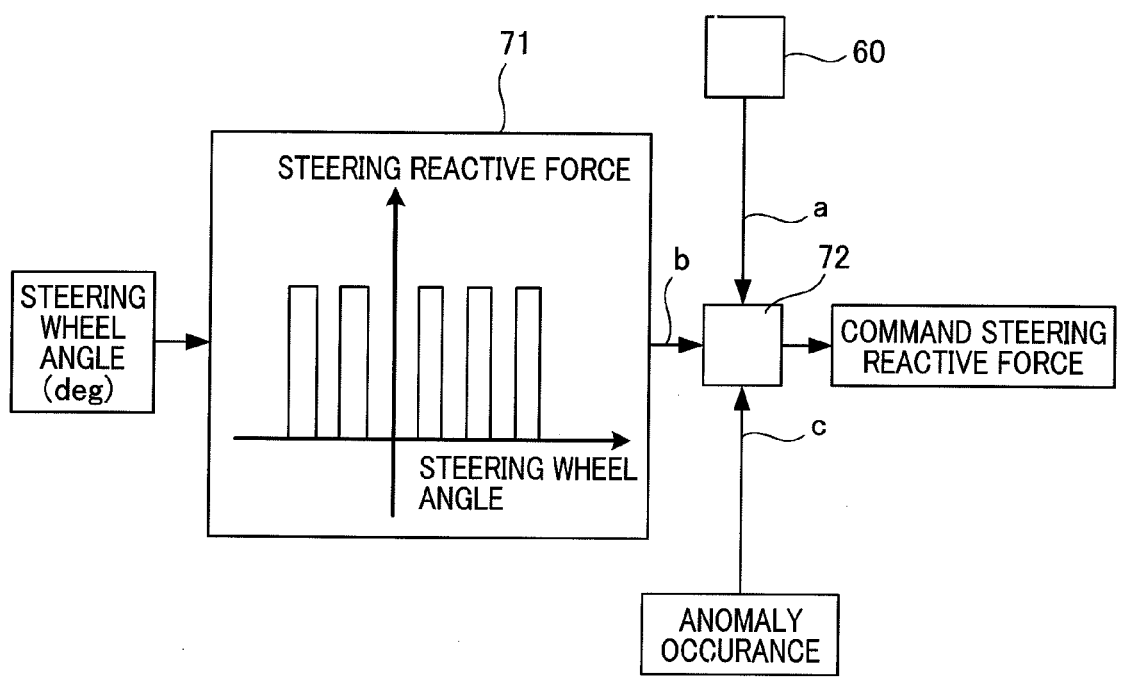
FIG. 3 is a block diagram illustrating process contents of a steering reactive force controller in a steering control device for a forklift according to a second embodiment example of the present invention.

FIG. 3 is a block diagram illustrating process contents of a steering reactive force controller in a steering control device for a forklift according to a second embodiment example of the present invention.

Note that, the overall configuration of the steering control device of the second embodiment example is similar to that of the first embodiment example (see FIG. 1), and thus the illustration and a detailed description thereof will be omitted here. The steering reactive force controller 32 in the steering control device of the second embodiment example includes a function to implement the process contents shown in FIG. 3 in addition to the same process contents as in the steering reactive force controller 32 in the steering control device of the first embodiment example (see FIG. 2). Hence, a detailed description is given of a part different from the first embodiment example, and the rest of configuration will not be described in detail here.

As shown in FIG. 3, the steering reactive force controller 32 in the steering control device of the second embodiment example includes table data 71 and a steering reactive force switching unit 72 in addition to the configuration of the first embodiment example (such as the sets of table data 52 to 58 and 60).

The table data 71 is table data representing the correlation between the steering wheel angle and the steering reactive force, which is previously stored in the storage, and is table data used for outputting an intermittent steering reactive force b which cannot occur in the normal steering, such as a rectangular waveform of the illustrated example or triangular waveform which changes intermittently. With the above configuration, the table data 71 unit outputs an intermittent command steering reactive force b, such as a rectangular waveform, according to the steering wheel angle detected by the steering wheel angle sensor 23, on the basis of the steering wheel angle detected by the steering wheel angle sensor 23 and the table data 71 representing the correlation between the steering wheel angle and the steering reactive force.

The steering reactive force switching unit 72 normally (when no anomaly is detected) selects a command steering reactive force outputted from the table data 60 described above as a command steering reactive force to be outputted to the brake driver 33. On the other hand, if some anomaly occurs in a vehicle (forklift) and an anomaly detection signal c is outputted to the steering reactive force switching unit 72 from vehicle anomaly detecting means (not shown) having detected the anomaly, the steering reactive force switching unit 72 switches, in response to the anomaly detection signal c, the command steering reactive force to be outputted to the brake driver 33 from the command steering reactive force a of the table data 60 unit to the command steering reactive force b of the table data 71 unit.

An anomaly of a vehicle includes, for example, an anomaly of a running motor monitored by a controller as the vehicle anomaly detecting means. If the temperature of the running motor or an inverter supplying the running motor with power exceeds a specified value, for example, the controller judges this as an anomaly because this may lead to a serious breakdown.

As has been described, in the steering control device of the second embodiment example, the device is configured to set the intermittent steering reactive force according to the steering wheel angle detected by the steering wheel angle sensor 23 as a command steering reactive force if the vehicle anomaly detecting means detects an anomaly of a vehicle, and to control the electric-control brake 31 so as to make the steering reactive force to be imparted to the steering wheel 22 equal to the set command steering reactive force. In this way, with the intermittent steering reactive force which cannot occur normally, the steering control device is capable of letting an operator recognize the occurrence of the vehicle anomaly in an earlier stage than in a conventional method of lighting a lamp indicative of the occurrence of the vehicle anomaly on a control panel or the like. This allows the operator to cope with the vehicle anomaly in an early stage.

Third Embodiment Example

Figure 4A:
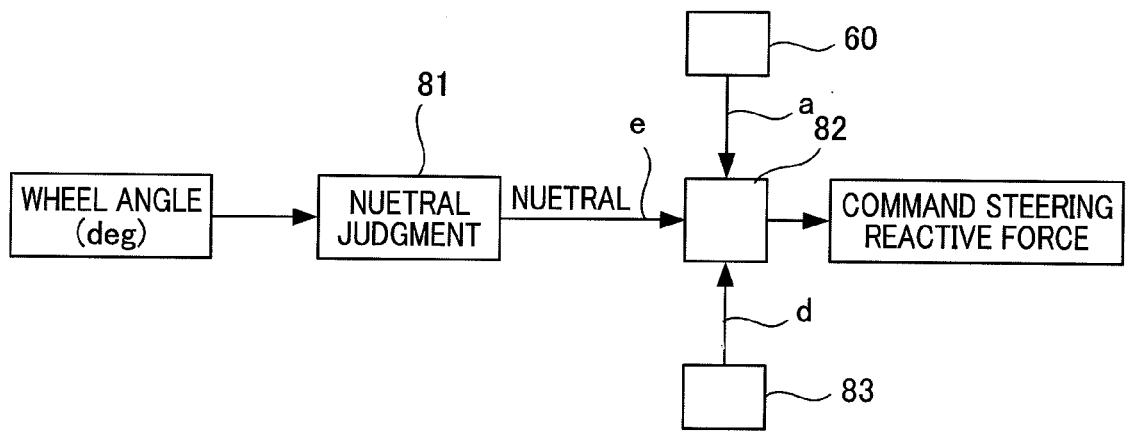
FIG. 4 (a) is a block diagram illustrating process contents of a steering reactive force controller in a steering control device for a forklift according to a third embodiment example of the present invention.
FIG. 4(b) is an explanation diagram illustrating a command steering reactive force obtained when the steering wheel angle is neutral.
Figure 4B:
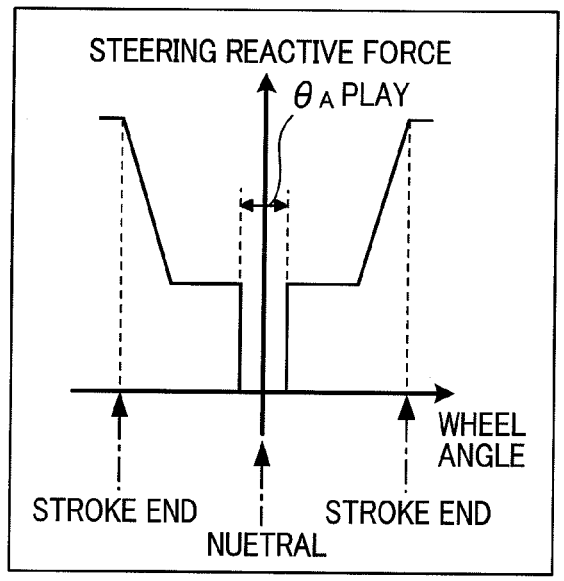
Figure 6:
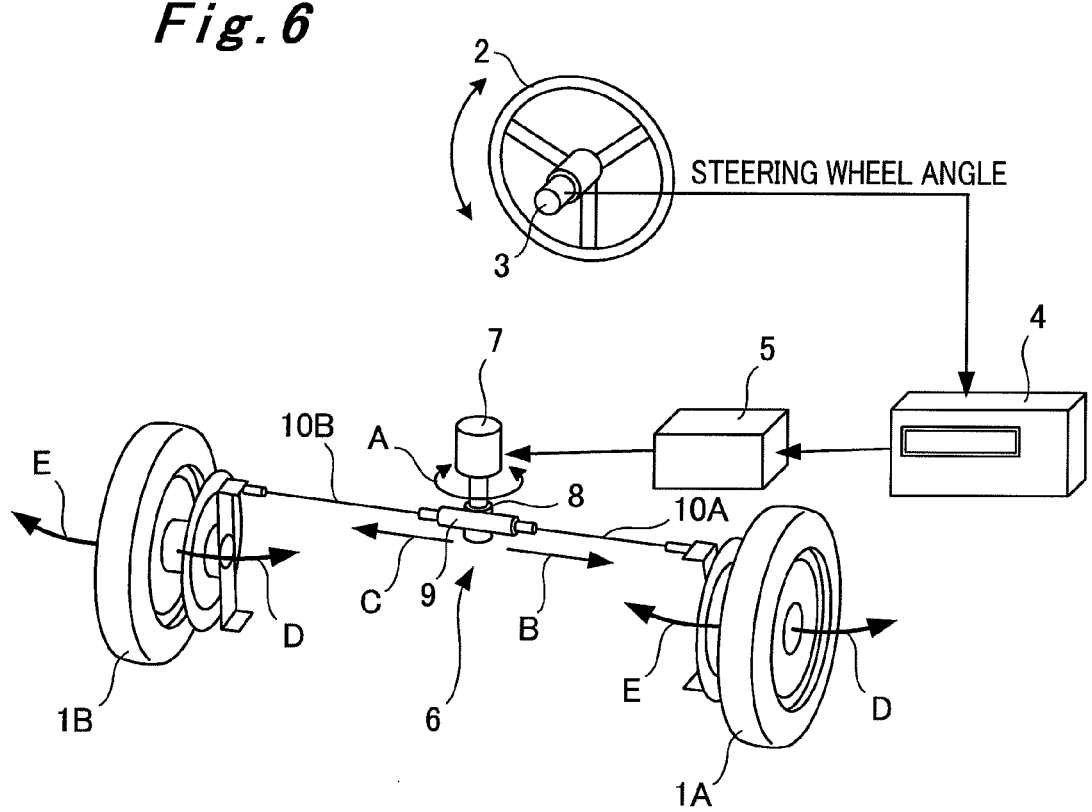
FIG. 6 is a diagram illustrating a configuration of a conventional steering control device for an industrial vehicle.
Figure 7:
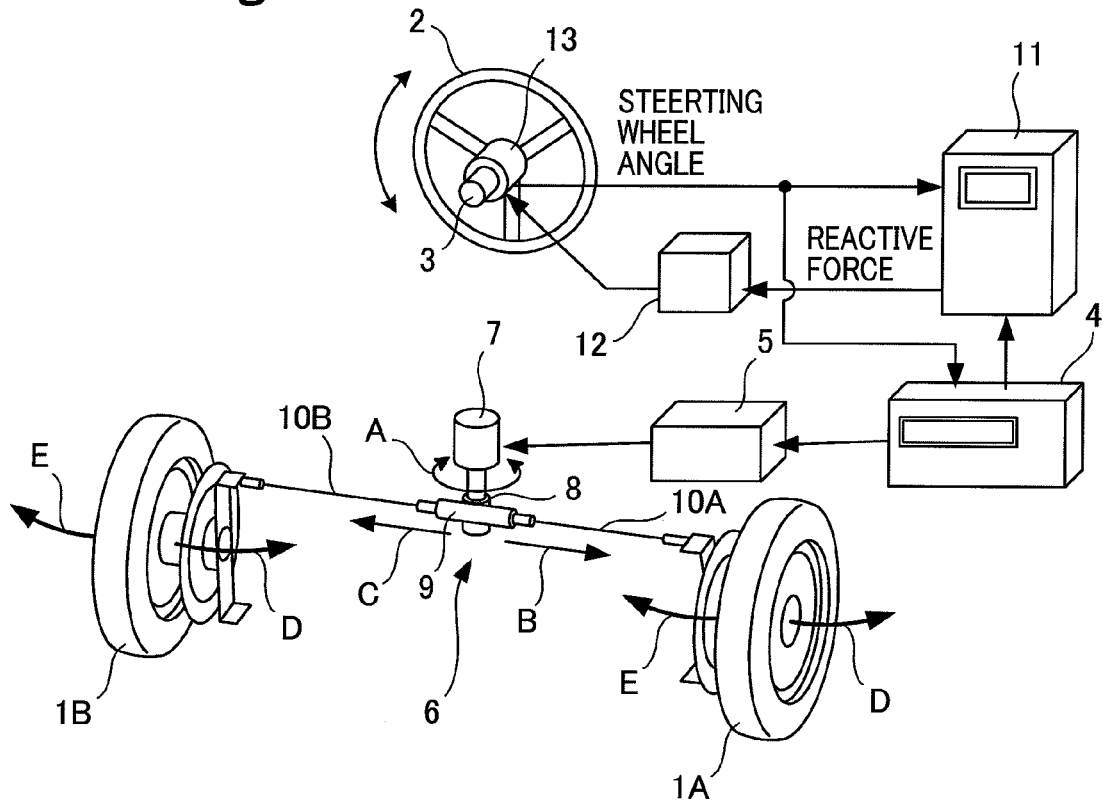
FIG. 7 is a diagram illustrating a configuration of a conventional steering control device capable of imparting a steering reactive force to a steering wheel.

FIG. 4(a) is a block diagram illustrating process contents of a steering reactive force controller in a steering control device for a forklift according to a third embodiment example of the present invention, and FIG. 4(b) is an explanation diagram illustrating a command steering reactive force obtained when the steering wheel angle is neutral.

Note that, the overall configuration of the steering control device of the third embodiment example is similar to that of the first embodiment example (see FIG. 1), and thus the illustration and a detailed description thereof will be omitted here. The steering reactive force controller 32 in the steering control device of the third embodiment example includes a function to implement the process contents shown in FIG. 4 in addition to the same process contents as in the steering reactive force controller 32 in the steering control device of the first embodiment example (see FIG. 2). Hence, a detailed description is given of a part different from the first embodiment example, and the rest of configuration will not be described in detail here.

As shown in FIG. 4(a), the steering reactive force controller 32 in the steering control device of the third embodiment example includes a neutral judging unit 81, a steering reactive force switching unit 82 and a steering reactive force setting unit 83 in addition to the configuration of the first embodiment example (such as the sets of table data 52 to 58 and 60).

The neutral judging unit 81 receives the wheel angle detected by the wheel angle sensor 41, and judges whether or not the steered wheels 21A and 21B are in a neutral state (state in which the steered wheels 21A and 21B are directed forward) on the basis of the received wheel angle. To be more specific, the neutral judging unit 81 judges whether or not the wheel angle detected by the wheel angle sensor 41 is within a predetermined angle range $\theta_A$ relative to a neutral position (position with a wheel angle of 0 degree). Then, if the wheel angle detected by the wheel angle sensor 41 falls within the predetermined angle range $\theta_A$, the neutral judging unit 81 judges that the steered wheels 21A and 21B are in the neutral state, and outputs a neutral judgment signal e to the steering reactive force switching unit 82.

When the wheel angle detected by the wheel angle sensor 41 does not indicate the neutral state (if no neutral judgment signal e is outputted from the neutral judging unit 81), the steering reactive force switching unit 82 selects the command steering reactive force a outputted from the table data 60 as a command steering reactive force to be outputted to the brake driver 33. On the other hand, if the wheel angle detected by the wheel angle sensor 41 indicates the neutral state and if the neutral judgment signal e is outputted from the neutral judging unit 81, the steering reactive force switching unit 82 switches, in response to the neutral judgment signal e, the command steering reactive force to be outputted to the brake driver 33 from the command steering reactive force a of the table data 60 unit to a command steering reactive force d of the steering reactive force setting unit 83. The command steering reactive force d outputted from the steering reactive force setting unit 83 is set to zero.

Accordingly, as shown in FIG. 4(*b*), a steering reactive force to act on the steering wheel 22 is zero when the wheel angle detected by the wheel angle sensor 41 is within the angle range $\theta_A$. In other words, the same feeling as in the play of the steering wheel 22 is given in the angle range $\theta_A$.

As has been described, in the steering control device of the third embodiment example, the device is configured to set the command steering reactive force to zero and thus cause the electric-control brake 31 to impart no steering reactive force to the steering wheel 22 if judging that the wheel angle detected by the wheel angle sensor 41 is in the neutral state. This allows an operator to certainly recognize the neutral state of the steered wheels (wheel angle). The above configuration allows preventing even a beginner operator from causing an accident such as a collision or rollover because of failing to recognize the neutral state of the steered wheels (wheel angle). The configuration also gives an operator the same feeling as in the play of the steering wheel 22, and thus improves the steering feeling given to the operator.

Fourth Embodiment Example

FIG. 5 is a diagram illustrating a configuration of a steering control device for a forklift according to a fourth embodiment example of the present invention.

Note that, the overall configuration of the steering control device of the fourth embodiment example is similar to that of the first embodiment example (see FIG. 1), and thus the illustration and a detailed description thereof will be omitted here. The steering control device of the fourth embodiment example uses the steering wheel including the electric-control brake (i.e., equipped with torque control) also as an input device (rotational switch) of a control panel. Hence, a detailed description is given of a part different from the first embodiment example, and the rest of configuration will not be described in detail here.

As shown in FIG. 5, according to the steering control device of the fourth embodiment example, the steering control device 24 and the control panel 110 are electrically connected to each other. The control panel 110 is used for the setting (changing) of various vehicle parameters and screen display modes such as the setting (changing) of the maximum vehicle speed, the setting (changing) of a remaining battery capacity display method, and the setting of the detailed display of a vehicle anomaly state, and for the display of various vehicle state amounts such as the display of the maximum vehicle speed, the display of a remaining battery capacity, and the display of a vehicle anomaly state.

The control panel 110 of the illustrated example is provided with, on its display 111: a vehicle speed display unit 101 displaying the maximum vehicle speed or current vehicle speed; a travelling direction display unit 102 indicating which position the gear of a vehicle is at, drive or reverse; a vehicle anomaly display unit 103 displaying an anomaly of the vehicle; an operating time display unit 104 displaying the operating time of the vehicle; a remaining battery capacity display unit 105 displaying the remaining battery capacity of a battery mounted on the vehicle; and a brake anomaly display unit 106 displaying an anomaly of a brake.

The steering controller 24 previously stores table data representing the correlation between the steering wheel angle and each of set values of vehicle parameters, such as the maximum vehicle speed, inputted from the control panel 110. In the third embodiment example, an operator operates an operation switch 112 of the control panel 110 while stopping a vehicle, for example. If an operation signal of this switch is inputted to the steering controller 24, the steering controller 24 disables its output of a command wheel angle to the motor driver 25 as indicated by a cross mark in FIG. 5, so that the steering wheel 22 may be used as an input device of the control panel 110.

If the operator operates the steering wheel 22 and changes the steering wheel angle in the above state, the changed steering wheel angle is detected by the steering wheel angle sensor 23, and a detection signal of the steering wheel angle is inputted to the steering controller 24. On the basis of the steering wheel angle detected by the steering wheel angle sensor 23 and the table data representing the correlation between the steering wheel angle and each of the set values of the vehicle parameters such as the maximum vehicle speed, the steering controller 24 obtains a set value of each of the vehicle parameters, such as the maximum vehicle speed, which corresponds to the steering wheel angle detected by the steering wheel angle sensor 23, and outputs the obtained set value to the control panel 110.

Alternatively, the operation on the setting (changing) of the screen modes such as the setting (changing) of the remaining battery capacity display method and the setting of the detailed display of the vehicle anomaly state may be made through the steering wheel 22. For example, in the steering controller 24, a screen mode setting (changing) operation is made through the steering wheel 22 by outputting, to the control panel 110, a screen mode setting signal according to the steering wheel angle detected by the steering wheel angle sensor 23.

When the setting (changing) operation of the vehicle parameters and the setting (changing) operation of the screen modes are made through the steering wheel 22 in the above manner, the steering reactive force controller 32 outputs, to the brake driver 33, a command steering reactive force according to the steering wheel angle detected by the steering wheel angle sensor 23, on the basis of the steering wheel angle detected by the steering wheel angle sensor 23 and the previously-stored table data representing the correlation between the steering wheel angle and the command steering reactive force. The brake driver 33 drives the electric-control brake 22 on the basis of the inputted command steering reactive force so as to make the brake force of the electric-control brake 31 equal to the command steering reactive force. In this way, a steering reactive force is imparted to the steering wheel 22 also when the steering wheel 22 is used as an input device of the control panel 110.

As has been described, in the steering control device of the third embodiment example, the device is configured to: obtain a command steering reactive force according to the steering wheel angle detected by the steering wheel angle sensor 23, on the basis of the steering wheel angle detected by the steering wheel angle sensor 23 and the table data representing the correlation between the steering wheel angle and the command steering reactive force, when the steering wheel 22 is used as an input device of the control panel 110; and control the electric-control brake 31 so as to make a steering reactive force to be imparted to the steering wheel 22 equal to the obtained command steering reactive force. Thus, the use of the steering wheel 22, to which a steering reactive force is imparted, as an input device of the control panel 110 gives a click feeling and thus improves the operation feeling of the control panel 110, as compared to a switching operation in a conventional control panel which gives no click feeling and thus gives the poor operation feeling.

Note that, although the description has been given above of the case where the steering control device of the present invention is applied to a forklift, the present invention is not limited thereto. The steering control device of the present invention may be applied to industrial vehicles other than a forklift, or vehicles other than industrial vehicles. Further, the configurations of the second to fourth embodiment examples may be used in any combination.

INDUSTRIAL APPLICABILITY

The present invention relates to a vehicle steering control device and method. It is therefore advantageous to apply the present invention to steering control for an industrial vehicle such as a forklift or a vehicle other than an industrial vehicle, in which a steering wheel and each steered wheel are not mechanically coupled to each other.

EXPLANATION OF REFERENCE NUMERALS 21A, 21B steered wheel, 22 steering wheel, 23 steering wheel angle sensor, 24 steering controller, 25 motor driver, 26 steering actuator, 27 electric motor, 28 pinion, 29 rack, 30A, 30B rod, 31 electric-control brake, 32 steering reactive force controller, 33 brake driver, 41 wheel angle sensor, 42 vehicle speed sensor, 43 load amount sensor, 44 lift height sensor, 45 steering shaft action-force sensor, 46 wheel angle stroke-end sensor, 47 vehicle attitude sensor, 51 deviation calculator, 52 to 58 table data, 59 adder, 60 table data, 61 wheel angle converter, 71 table data, 72 steering reactive force switching unit, 81 neutral judging unit, 82 steering reactive force switching unit, 83 steering reactive force setting unit, 101 vehicle speed display unit, 102 travelling direction display unit, 103 vehicle anomaly display unit, 104 operating time display unit, 105 remaining battery capacity display unit, 106 brake anomaly display unit, 110 control panel, 111 display, 112 operation switch.

The invention claimed is:

1. A vehicle steering control device, comprising:
wheel angle detecting means that detects a wheel angle;
a steering reactive force controller that determines a command steering reactive force based on the detected wheel angle;
steering reactive force imparting means that imparts a steering reactive force to a steering wheel based on the determined command steering reactive force; and
vehicle state amount detecting means that detects a vehicle state amount other than the wheel angle, the vehicle state amount including at least one of a load amount on a fork of a forklift and a lift height of the fork on the forklift,
wherein the device is configured to:
    obtain a correction coefficient based on the detected vehicle state amount;
    correct a correlation between the detected wheel angle and the command steering reactive force by the obtained correction coefficient to obtain a corrected command steering reactive force; and
    control the steering reactive force imparting means based on the corrected command steering reactive force,
the vehicle steering control device further comprising:
vehicle anomaly detecting means that detects an anomaly of the vehicle, wherein
the device is configured to:
set an intermittent steering reactive force according to the detected steering wheel angle as the command steering reactive force when the vehicle anomaly detecting means detects the anomaly of the vehicle.

2. A vehicle steering control device, comprising:
wheel angle detecting means that detects a wheel angle;
a steering reactive force controller that determines a command steering reactive force based on the detected wheel angle;
steering reactive force imparting means that imparts a steering reactive force to a steering wheel based on the determined command steering reactive force; and
vehicle state amount detecting means that detects a vehicle state amount other than the wheel angle, the vehicle state amount including at least one of a load amount on a fork of a forklift and a lift height of the fork on the forklift,
wherein the device is configured to:
    obtain a correction coefficient based on the detected vehicle state amount;
    correct a correlation between the detected wheel angle and the command steering reactive force by the obtained correction coefficient to obtain a corrected command steering reactive force; and
    control the steering reactive force imparting means based on the corrected command steering reactive force, and
wherein the device is configured to set the command steering reactive force to zero and thus cause the steering reactive force imparting means to impart no steering reactive force to the steering wheel when the detected wheel angle is in a neutral state.

* * * * *